(12) United States Patent
Chan (10) Patent No.: US 10,536,833 B1
(45) Date of Patent: Jan. 14, 2020

(54) ARTIFICIAL INTELLIGENCE INTERNET PROTOCOL PRIVATE BRANCH EXCHANGE (IP-PBX) SYSTEM WITH MOBILE VALUE-ADDED SERVICES

(71) Applicant: Charles Lap San Chan, Taipei (TW)

(72) Inventor: Charles Lap San Chan, Taipei (TW)

(*) Notice: Subject to any disclaimer, the term of this patent is extended or adjusted under 35 U.S.C. 154(b) by 0 days.

(21) Appl. No.: 16/391,917

(22) Filed: Apr. 23, 2019

(30) Foreign Application Priority Data

Sep. 11, 2018 (TW) .............................. 107131804 A (51) Int. Cl.
| | |
|---|---|
| *H04W 4/60* | (2018.01) |
| *H04W 4/50* | (2018.01) |
| *H04W 4/24* | (2018.01) |
| *G06N 5/02* | (2006.01) |
| *G06F 16/23* | (2019.01) |
| *G06F 16/245* | (2019.01) |
| *G06Q 20/08* | (2012.01) |
| *G06F 16/22* | (2019.01) |

(52) U.S. Cl.
CPC .............. *H04W 4/60* (2018.02); *G06F 16/22* (2019.01); *G06F 16/2365* (2019.01); *G06F 16/245* (2019.01); *G06N 5/02* (2013.01); *G06Q 20/085* (2013.01); *H04W 4/24* (2013.01); *H04W 4/50* (2018.02)

(58) Field of Classification Search
CPC ........... H04W 4/60; H04W 4/50; H04W 4/24; G06N 5/02; G06F 16/2365; G06F 16/245; G06F 16/22; G06Q 20/085
See application file for complete search history.

(56) References Cited

U.S. PATENT DOCUMENTS

2015/0088523 A1* 3/2015 Schuster ................. G10L 15/22
704/275
2018/0152520 A1* 5/2018 Sundaresan ......... G06F 16/9574

* cited by examiner

*Primary Examiner* — Wayne H Cai
(74) *Attorney, Agent, or Firm* — Muncy, Geissler, Olds & Lowe, P.C.

(57) ABSTRACT

An artificial intelligence IP-PBX system with mobile value-added services collaboratively operates a cloud server, an IP-PBX, and a master application (APP). The cloud server is provided with a payment module and a first registration module and provided to a user for uploading APP information edited by an APP developer and storing the APP information in a first database. The cloud server is used as an independent platform like the APP Store. The IP-PBX is provided with an AI mechanism that analyzes instant messages of users and performs a correlative comparison on the first database and a second database to calculate and show the list of optimal requirements. The master APP is installed in a host device and provided to the user for performing an instant messaging operation. The master APP uses a displaying unit to display the list of optimal requirements for utilization by users.

7 Claims, 5 Drawing Sheets

ARTIFICIAL INTELLIGENCE INTERNET PROTOCOL PRIVATE BRANCH EXCHANGE (IP-PBX) SYSTEM WITH MOBILE VALUE-ADDED SERVICES

This application claims priority for Taiwan patent application no. 107131804 filed on Sep. 11, 2018, the content of which is incorporated by reference in its entirety.

BACKGROUND OF THE INVENTION

Field of the Invention

The present invention relates to an Internet protocol private branch exchange (IP-PBX) system, particularly to an artificial intelligence IP-PBX system with mobile value-added services including a cloud server, an IP-PBX, and a master application and having applications in various mobile functions.

Description of the Related Art

Based on the Internet protocol, developers (e.g., enterprises) use Internet protocol private branch exchanges (IP-PBXs) to develop value-added services and applications. Presently, the value-added applications of the IP-PBX are provided by developers (e.g., enterprises). The basic application is in replacing the conventional private branch exchanges (PBXs) and providing the central switchboard more conveniently managed and used.

For IP-PBXs, mobile requirements are important. However, the IP-PBXs have many applications in the service of the switchboard and the traffic development of mobile extensions. Mobile requirements are very significant to users. The present application merely overcomes the problem with mobile extensions. It is a pity that more useful and more convenient research and development do not be applied to mobile integration in other aspects.

To overcome the abovementioned problems, the inventor of the present invention actively researches and seeks breakthroughs based on professional capabilities for research, development and manufacture and design experience in the field of traffic communications. Based on the Internet protocol, IP-PBXs have mobile value-added applications in many fields. If the internal user of the IP-PBX has a machine, the user will have a very convenient life, which is in line with the expectation of users. Therefore, under the premise of maintaining the bandwidth and communication quality of the IP-PBX, the inventor provides an artificial intelligence IP-PBX system with mobile value-added services, which combines a cloud server with a master application (APP) and has applications in various mobile functions.

SUMMARY OF THE INVENTION

The primary objective of the present invention is to provide an artificial intelligence IP-PBX system with mobile value-added services, which includes a cloud server, an IP-PBX, and a master application (APP) and has applications in various mobile functions.

The secondary objective of the present invention is to provide an artificial intelligence IP-PBX system with mobile value-added services, which actively shows the list of optimal requirements (suggested by the APP) and provides interactive feedback according to instant messages (e.g., questions or requirements) of users.

To achieve the abovementioned objectives, the present invention provides an artificial intelligence IP-PBX system with mobile value-added services, which comprises a cloud server including a first registration module, a first database, and a payment module, the first registration module configured to upload application (APP) information edited by an application (APP) developer and store the APP information in the first database, the first database configured to access the APP information, and the payment module connected to the first database and the first registration module and configured to verify registration integrity of the APP information and generate a payment message to respond to the APP developer; an Internet protocol private branch exchange (IP-PBX) including an instant messaging servo module, a semantic analysis module, a correlation computing module, a second registration module, a responding module, and a second database, the second database configured to preload from the cloud server at least a piece of the APP information registered, the second registration module provided to a user for editing favorable application (APP) information, storing the favorable APP information in the second database, and synchronously uploading the favorable APP information to the first database of the cloud server, the instant messaging servo module configured to receive, transmit, and store instant messages transmitted between the IP-PBX and a host device, the semantic analysis module configured to analyze the instant message obtained from the host device to retrieve at least a key word, the correlation computing module configured to search a related application (APP) in the first database and the second database according to the at least a key word and perform a weight operation on a searched result to generate a correlating result, and the responding module configured to edit and integrate contents according to the correlating result to generate a responding message and transmit the responding message to the instant messaging servo module; and a master application (APP), installed in the host device, including a questioning unit and a displaying unit, the questioning unit provided to the user for inputting the instant message to transmit the instant message to the IP-PBX, and the displaying unit configured to receive and display the responding message obtained by the IP-PBX.

In an embodiment of the present invention, the correlation computing module includes an application programming interface (API) transceiver unit and a weight calculation unit, and the responding module includes a content integrating unit and a speech editing unit.

In an embodiment of the present invention, the host device is an Internet-enabled electronic device, and the electronic device further comprises a global positioning system (GPS) module, a microphone, and a camera. For example, smartphones, tablet computers, notebook computers, and desktop computers can install the master APP.

In an embodiment of the present invention, the system divided into three collaboratively operating parts has applications in various mobile functions.

The first part is the cloud server, which is provided with a (launched) payment module (e.g., a transaction mechanism) and a first registration module and configured to upload the APP information edited by the APP developer and store the APP information in the first database. Like the APP Store, the cloud server is used as a cloud platform where the APP information developed by the APP developer is uploaded. Thus, in addition to the (Google) Android Play Store and the Apple Store, the APP developer also uses an independent platform for marketing promotion.

The second part is the IP-PBX, which presets internal users, such as all staffs of an enterprise. The IP-PBX further comprises an instant messaging servo (IMS) module, an artificial intelligence (AI) mechanism (including a semantic analysis module, a correlation computing module, and a responding module), a second database, and a second registration module. The second registration module is provided to a user for editing favorable application (APP) information, storing the favorable APP information in the second database, and synchronously uploading the favorable APP information to the first database of the cloud server. The second database is configured to preload from the cloud server at least a piece of the APP information registered.

When the IP-PBX receives the instant message from the master APP, the AI mechanism analyzes the instant message, searches the registered APP corresponding to the requirement of the instant message in the first database of the cloud server and the second database, correlatively calculates and shows the list of optimal APPs (best satisfying requirements), and transmits the list of optimal APPs to the master APP whereby the displaying unit displays the list of optimal APPs. According to the content of the analyzed instant message, the AI mechanism transmits commands for starting the hardware of the host device, such as a GPS module, a microphone, and a camera.

The third part is the master APP. The user of the IP-PBX inputs words or speech messages to the questioning unit to raise requirements after the host device is installed with the master APP. The displaying unit displays the list of optimal APPs (best satisfying requirements) calculated by the AI mechanism of the IP-PBX, such that the user directly chooses (guiding the user to the APP to execute it) the suitable APP actively suggested by the list to interact according to the user's questions (e.g., requirements) without downloading the proper APP from the external APP Store and installing the proper APP.

In conclusion, the present invention collaboratively operates the cloud server, the IP-PBX, and the master APP to provide the users of the IP-PBX with applications in various mobile functions. Below, the embodiments are described in detail in cooperation with the drawings to make easily understood the technical contents, characteristics and accomplishments of the present invention.

DETAILED DESCRIPTION OF THE INVENTION

The present invention provides a complete Internet protocol (phone) private branch exchange (PBX) system, which collaboratively operates a cloud server and a master application (APP) to provide users of the IP-PBX with applications in various mobile functions. In a preferred embodiment, the present invention actively responds and suggests the suitable application (APP) to interact according to the user's questions (e.g., requirements), which is introduced as follows.

Figure 1:
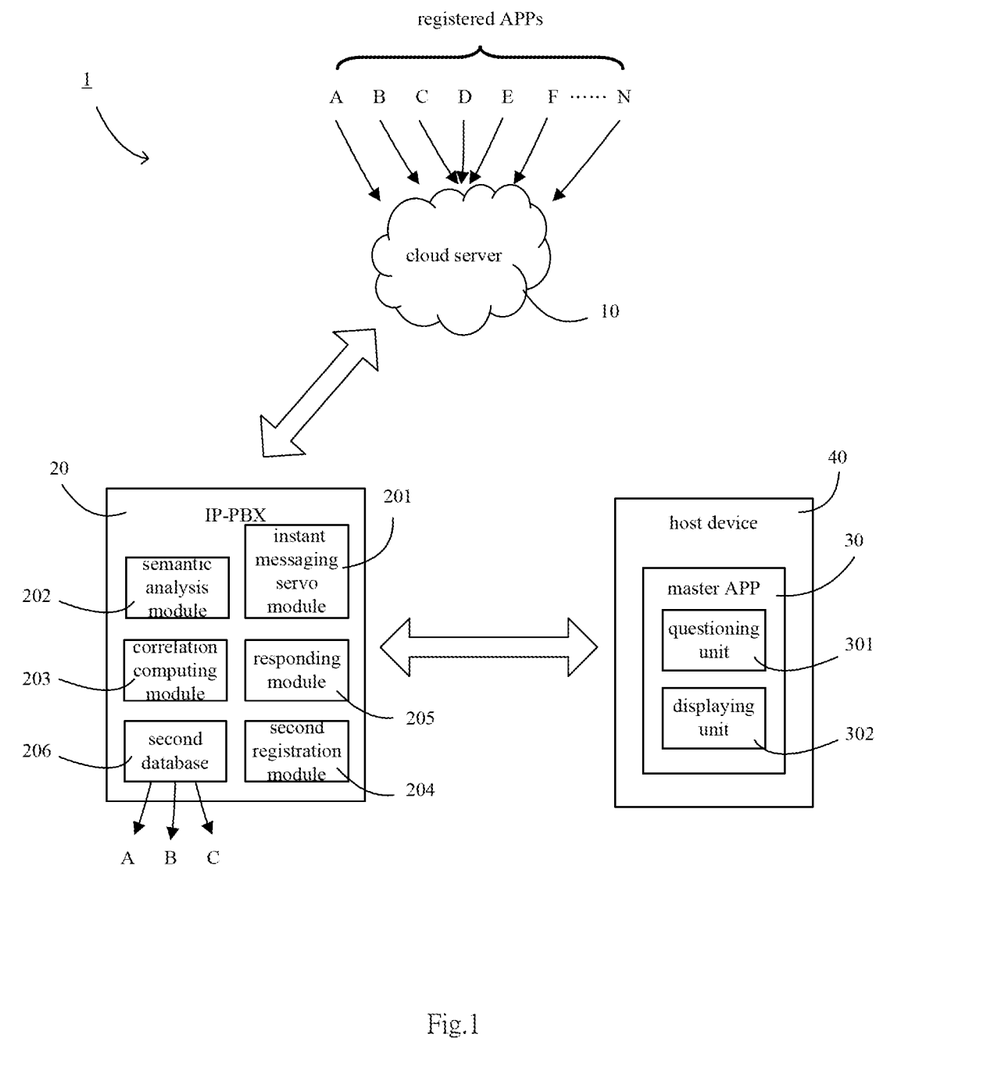
FIG. 1 is a diagram schematically showing the architecture of an artificial intelligence Internet protocol private branch exchange (IP-PBX) system according to an embodiment of the present invention.

Refer to FIG. 1. FIG. 1 is a diagram schematically showing the architecture of an artificial intelligence Internet protocol private branch exchange (IP-PBX) system 1 according to an embodiment of the present invention. The present invention collaboratively operates a cloud server 10, an Internet protocol private branch exchange (IP-PBX) 20, and a master application (APP) 30. The master APP is installed in a host device 40. The host device 40 is an Internet-enabled electronic device. The electronic device further comprises a global positioning system (GPS) module, a microphone, and a camera. For example, the host device 40 may be a smartphone, a tablet computer, a notebook computer, or a desktop computer, and the device is installed with the master APP 30 of the system 1. The master APP 30 includes a questioning unit 301 and a displaying unit 302. The questioning unit 301 is provided to a user for inputting an instant message to transmit the instant message to the IP-PBX 20. The displaying unit 302 receives and displays the responding message obtained by the IP-PBX 20.

The cloud server 10 is provided to an application (APP) developer for uploading application (APP) information edited by the APP developer FIG. 1 shows that the cloud server 10 has accepted the registered APP information A, B, C, D, E, F, . . . , and N uploaded by the APP developer. The architecture of the cloud server 10 is shown in FIG. 2 and introduced as follows.

The IP-PBX 20 includes an instant messaging servo module 201, a semantic analysis module 202, a correlation computing module 203, a second registration module 204, a responding module 205, and a second database 206. According the planning, the second database 206 preloads from the cloud server 10 at least a piece of the registered APP information in advance. As shown in FIG. 1, the second database 206 has preloaded the APP information A, B, and C. The second registration module 204 is provided to the user for editing favorable application (APP) information, storing the favorable APP information in the second database 206, and synchronously uploading the favorable APP information to the cloud server 10. The instant messaging servo module 201 receives, transmits, and stores instant messages transmitted between the IP-PBX 20 and the host device 40. The semantic analysis module 202 analyzes the instant message obtained from the host device 40 to retrieve at least a key word. The correlation computing module 203 searches the related application (APP) in the cloud server 10 and the second database 206 according to the key word and perform a weight operation on a searched result to generate a correlating result. The responding module 205 edits and integrates contents according to the correlating result to generate a responding message and transmit the responding message to the instant messaging servo module 202. The instant messaging servo module 202 transits the responding message to the host device 40, such that the host device 40 displays the responding message.

Figure 2:
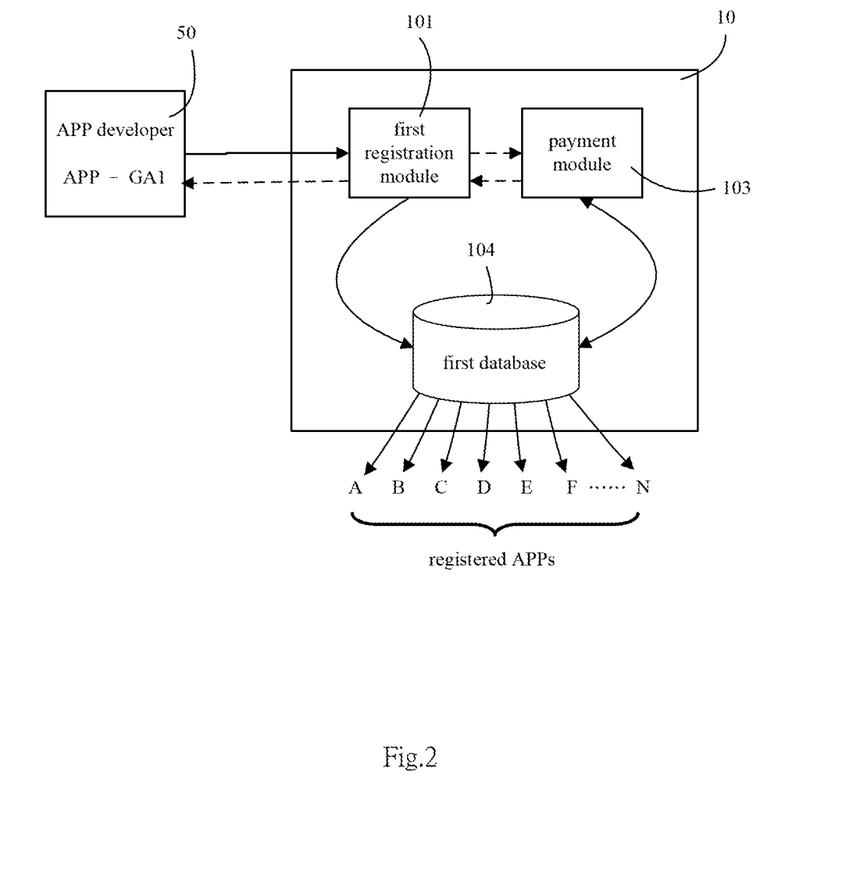
FIG. 2 is a diagram schematically showing the architecture of a cloud server according to an embodiment of the present invention.

Refer to FIG. 2. FIG. 2 is a diagram schematically showing the architecture of a cloud server according to an embodiment of the present invention. The cloud server 10 includes a first registration module 101, a first database 102, and a payment module 103. The first registration module 101 is provided to the APP developer for uploading APP information edited by the APP developer and storing the APP information in the first database 102. The first database 102 is configured to access the APP information. The payment module 103 is connected to the first database 102 and the first registration module 101 and configured to verify the registration integrity of the uploaded APP information and generate a payment message to respond to the APP developer. In the existing technology, there are many methods of paying cash flows that can achieve the secure purpose. This method is not novel technology but a combination of the well-known technologies. Alternatively, this method cooperates with other software of secure payment so will not be reiterated.

In a preferred embodiment of the present invention, the system divided into three collaboratively operating parts has applications in various mobile functions.

The first part is the cloud server 10, which is provided with the (launched) payment module 103 (e.g., a transaction mechanism) and the first registration module 101 and provided to an APP developer 50 for uploading the APP information edited by the APP developer 50 and storing the APP information in the first database 102. As shown in FIG. 2, the cloud server 10 like the Android Google Play Store and the iOS Apple Store has accepted the registered APP information A, B, C, D, E, F, . . . , and N uploaded by the APP developer. The APP developer 50 provides and applies a new APP GA1 for registration and uploads the new APP GA1 to the cloud server 10 (e.g., a cloud marketing platform). Thus, in addition to the Android Google Play Store and the iOS Apple Store, the APP developer 50 also uses an independent platform for marketing promotion.

The Android Google Play Store and the iOS Apple Store at least have tens of thousands of applications (APPs) and sort the APPs according to the frequency of downloading APPs or evaluation of using APPs. The (passive) visibility of just-launched novel APPs or endlessly-updating excellent APPs that cannot rank in the first page due to the fact that the frequency of previously downloading the endlessly-updating APPs is low is quite low. Thus, it costs a lot of money to market and promote the just-launched APPs and the endlessly-updating APPs in the APP Store. There is no other way than this. The present invention adds an independent platform for marketing promotion, wherein the independent platform has basic users (e.g., all internal users preset by the IP-PBX 20). The system recommends the correlated registered APPs to the internal user having questions or requirements to increase the visibility of the APPs. The independent platform is more attractive and beneficial for the APP developer 50.

The second part is the IP-PBX 20, which presets internal users, such as all staffs of an enterprise. The IP-PBX 20 further comprises an instant messaging servo (IMS) module 201, an artificial intelligence (AI) mechanism (including a semantic analysis module 202, a correlation computing module 203, and a responding module 205), a second database 206, and a second registration module 204. The second registration module 204 is provided to the user for editing favorable application (APP) information, storing the favorable APP information in the second database 206 of the IP-PBX 20, and synchronously uploading the favorable APP information to the first database 102 of the cloud server 10. According the planning, the second database 206 preloads from the cloud server 10 at least a piece of the registered APP information in advance. As shown in FIG. 1, the second database 206 has preloaded the APP information A, B, and C.

When the IP-PBX 20 receives the instant message from the master APP 30, the AI mechanism (including the semantic analysis module 202, the correlation computing module 203, and the responding module 205) analyzes the instant message, searches the registered APP corresponding to the requirement of the instant message in the first database 102 of the cloud server 10 and the second database 206, correlatively calculates and shows the list of optimal APPs (best satisfying requirements), and transmits the list of optimal APPs to the master APP 30 whereby the displaying unit 302 displays the list of optimal APPs. According to the content of the analyzed instant message, the AI mechanism transmits commands for starting the hardware of the host device 40, such as a GPS module, a microphone, and a camera.

The third part is the master APP 30. The user of the IP-PBX 20 inputs words or speech messages to the questioning unit 301 to raise requirements after the host device 40 is installed with the master APP 30. The displaying unit 302 displays the list of optimal APPs (best satisfying requirements) calculated by the AI mechanism of the IP-PBX 20, such that the user directly chooses (guiding the user to the APP to execute it) the suitable APP actively suggested by the list to interact according to the user's questions (e.g., requirements) without downloading the proper APP from the external APP Store and installing the proper APP.

Figure 3:
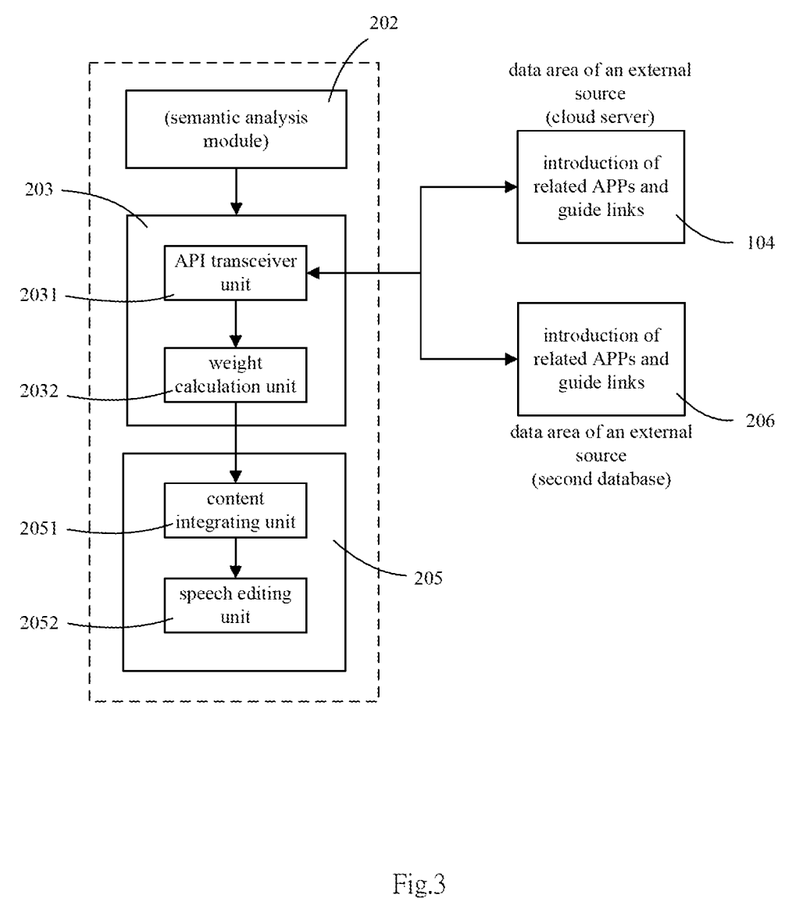
FIG. 3 is a diagram schematically showing an artificial intelligence mechanism according to an embodiment of the present invention.

Refer to FIG. 3. The operation of the AI mechanism is described as follows. The AI mechanism includes the semantic analysis module 202, the correlation computing module 203, and the responding module 205. Based on the vector space model, the semantic analysis module 202 uses a neural network-based approach or an autoencoder-based approach to analyze the instant message obtained from the host device 40 and retrieve at least a key word. The correlation computing module 203 includes an application programming interface (API) transceiver unit 2031 and a weight calculation unit 2032. The APP developer 50 provides the API interfaces of the registered APPs to connect to the cloud server 10, such that the API interfaces and the cloud server 10 share and obtain data when the APP developer 50 applies for registration in the cloud server 10. When the IP-PBX 20 preloads the proper APPs, the IP-PBX 20 synchronously downloads the API interfaces of the preloaded APPs to connect to the APPs preloaded by the second database 206 of the IP-PBX 20. The API transceiver unit 2031 serves as the API interfaces. After searching for the preloaded APPs in the second database 206 of the IP-PBX 20 (whether the APP corresponding to the key word is found or not), more related APPs in the first database 102 of the cloud server 10 are further searched. If the related APPs are found in the first database 102, the related APPs and API interfaces thereof are downloaded to the second database 206 of the IP-PBX 20. The weight calculation unit 2032 performs a correlating weight analysis on each of several pieces of APP information to generate a correlating result. This weight analysis is not novel technology but a combination of the well-known technologies. Alternatively, the weight analysis cooperates with other software of correlating operating analysis so will not be reiterated. The responding module 205 includes a content integrating unit 2051 and a speech editing unit 2052. The content integrating unit 2051 sorts, edits, and manages the correlating result generated by the weight calculation unit 2032 to generate display content for satisfying requirements of the user. The speech editing unit 2052 converts words of the display content into speech messages to edit or establish guiding speech files, such as greeting speech files, integrates the display content and the speech files into a responding message, and transmits the responding message to the instant messaging servo module 202. The instant messaging servo module 202 transmits the responding message to the host device 40, such that the displaying unit 302 of the master APP 30 displays the responding message.

Figure 4:
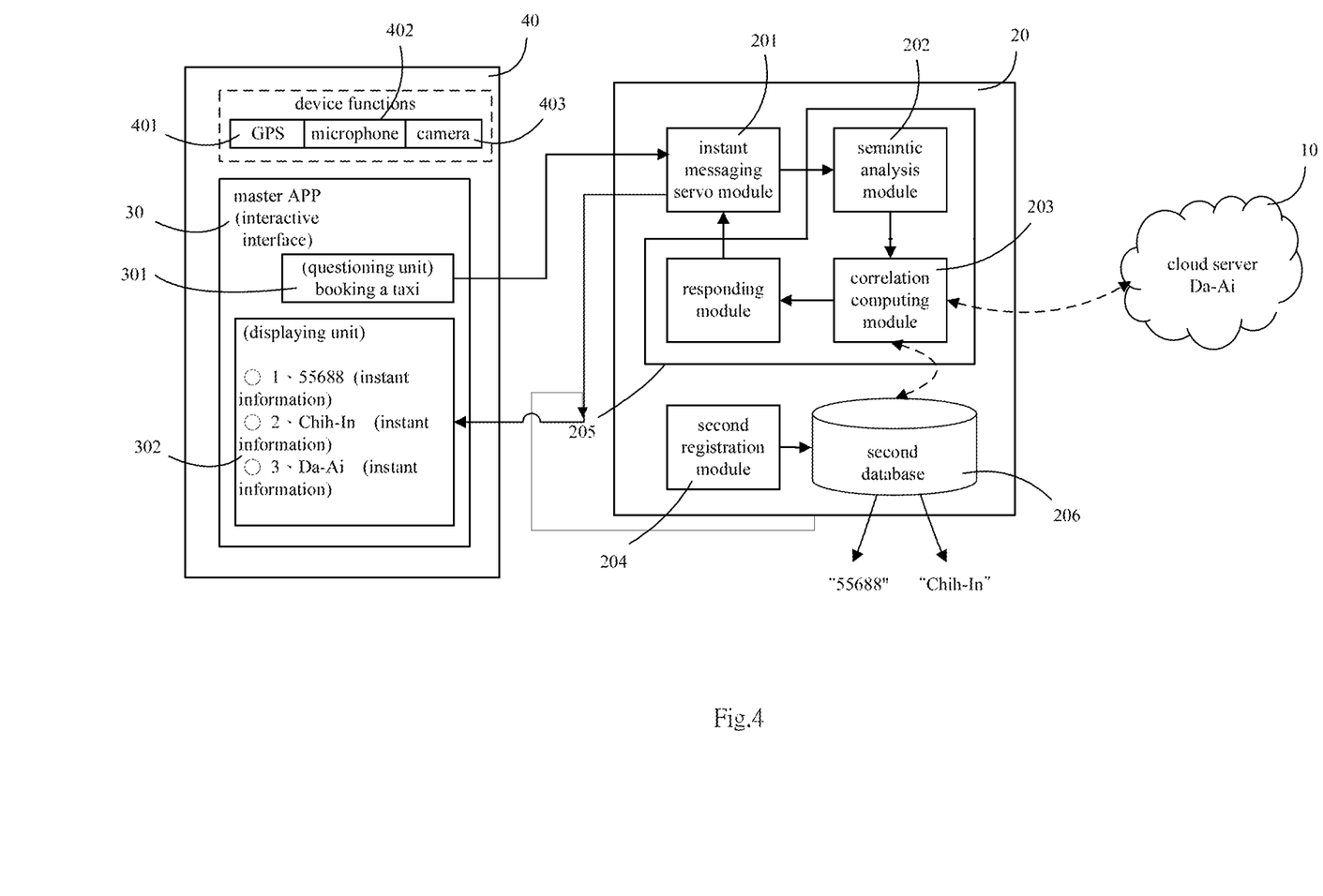
FIG. 4 is a diagram schematically showing the architecture of an artificial intelligence Internet protocol private branch exchange (IP-PBX) system according to another embodiment of the present invention.
Figure 5:
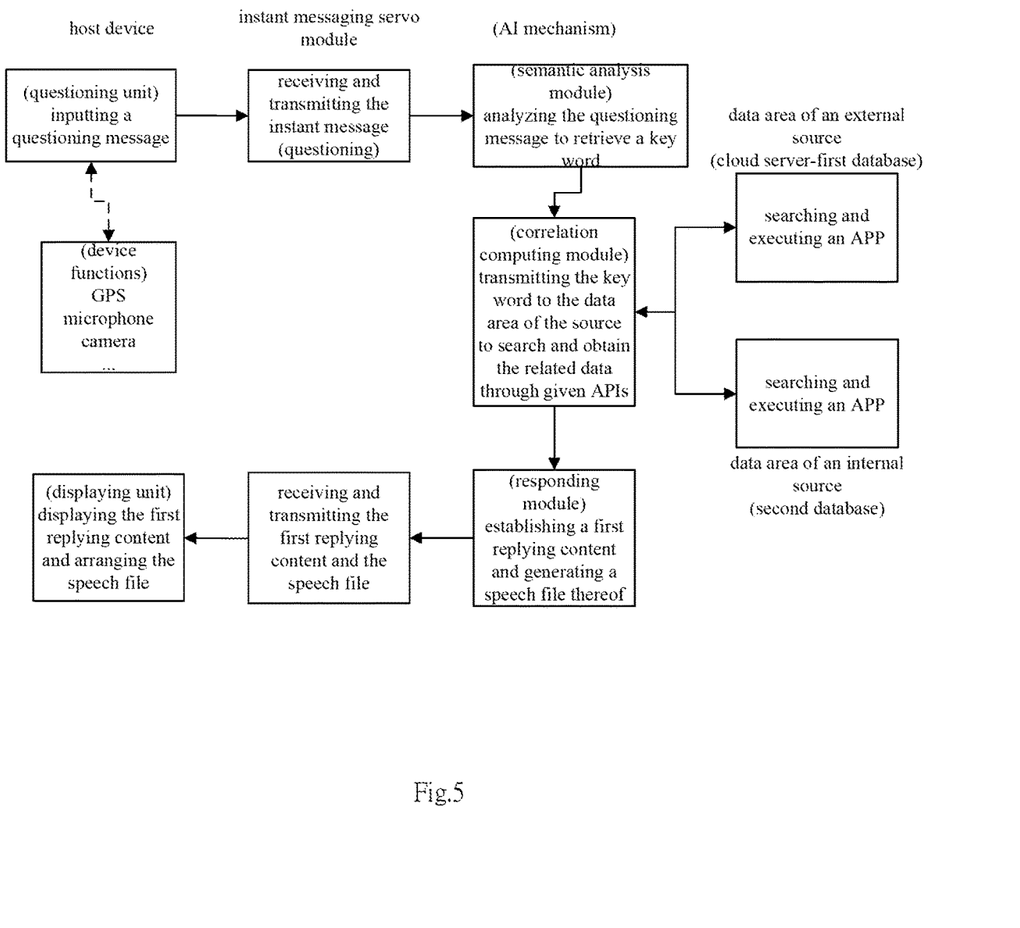
FIG. 5 is a block diagram schematically showing an artificial intelligence Internet protocol private branch exchange (IP-PBX) system according to an embodiment of the present invention.

Refer to FIG. 4 and FIG. 5. FIG. 4 is a diagram schematically showing the architecture of an artificial intelligence IP-PBX system according to another embodiment of the present invention. FIG. 4 shows that the user raises a question and obtains a response. FIG. 5 is a block diagram schematically showing an artificial intelligence IP-PBX system according to an embodiment of the present invention. Each of the internal users of the IP-PBX 20 has the host device 40 installed with the master APP 30 of the present invention. The host device 40 is an Internet-enabled electronic device. The host device 40 further comprises a global positioning system (GPS) module 401, a microphone 402, and a camera 403. For example, the host device 40 may be a smartphone, a tablet computer, a notebook computer, or a desktop computer. The smartphone, the tablet computer, the notebook computer, or the desktop computer can be installed with the master APP 30. After installing the master APP 30, words or speech messages are inputted to the questioning unit 301 to raise requirements. As shown in FIG. 4, the user inputs "booking a taxi" to the interface of the questioning unit 301 and presses the send button to transmit the instant message to the IP-PBX 20. The instant messaging servo module 201 receives and stores the instant message and transmits it to the semantic analysis module 202 of the AI mechanism for retrieving a key word. Since the number of words inputted to the questioning unit 301 is less, the analyzed key words are also "booking a taxi". After analyzing at least a set of key words, the key words are transmitted to the correlation computing module 203 to search the related APPs and generate a correlating result. The correlation computing module 203 searches the APPs preloaded by the second database 206, finds and records the APPs "Chih In" and "55688" corresponding to the key words "booking a taxi" in the second database 206, and then searches more APPs in the first database 102 of the cloud server 10 to determines whether the APPs correspond to the key words "booking a taxi". The APP "Da Ai" and an API interface thereof are downloaded to the second database 206 of the IP-PBX 20 when the APP "Da Ai" corresponding to the key words "booking a taxi" in the first database 102 of the cloud server 10 is found. Then, the correlating weight analysis is performed on each of the found APPs to generate a correlating result. The responding module 205 integrates and edits content according to the correlating result to generate a responding message. The responding module 205 transmits the responding message to the instant messaging servo module 202. The instant messaging servo module 202 stores the responding message and transmits it to the host device 40, such that the displaying unit 302 of the master APP 30 displays the responding message, as shown in FIG. 4. According to the result processed by the weight analysis, the displaying unit 302 displays and arranges the APPs in order (in various displaying ways). The APPs displayed by the displaying unit 302 is provided to the user for choosing. The present invention actively suggests the suitable APPs to interact according to the user's questions (e.g., requirements). The user does not need to download the proper APP from the external APP Store and install the proper APP. When the user choose one of the APPs, the master APP 30 opens a new window linking to the installation page of the chosen APP. When the user raises a requirement, the AI mechanism analyzes the requirement to generate a response, thereby completing the entire process. The user downloads the chosen APP or uses other methods, which is not included within the scope of the present invention.

The present invention collaboratively operates the IP-PBX, the cloud server, and the master APP to provide a human-machine interaction system, which is an artificial intelligence IP-PBX system with mobile value-added services having applications in various mobile functions. According to the content of the analyzed instant message, the artificial intelligence (AI) mechanism (including the semantic analysis module 202, the correlation computing module 203, and the responding module 205) transmits commands for starting the hardware of the host device 40, such as the GPS module 401, the microphone 402, and the camera 403. Thus, the present invention has various applications in human-machine interaction. For example, the user inputs "check-in" to the questioning unit 301. After the system processes the input requirement, the system starts the GPS module 401 or the camera 403 of the host device 40, finds the APPs related to the "check-in" function, and actively updates the check-in states of all the related APPs. That is to say, the check-in states of the common APPs registered in the IP-PBX 20 and the cloud server 10 are updated after checking in the master APP 30.

In conclusion, the present invention provides a novel IP-PBX system and applications in various mobile functions for users of the IP-PBX and actively suggests the suitable APPs to interact according to the user's questions (e.g., requirements). The embodiments, applications in mobile functions and human-machine interaction described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. An artificial intelligence Internet protocol private branch exchange (IP-PBX) system with mobile value-added services comprising:

a cloud server including a first registration module, a first database, and a payment module, the first registration module configured to upload application (APP) information edited by an application (APP) developer and store the APP information in the first database, the first database configured to access the APP information, and the payment module connected to the first database and the first registration module and configured to verify registration integrity of the APP information and generate a payment message to respond to the APP developer;

an Internet protocol private branch exchange (IP-PBX) including an instant messaging servo module, a semantic analysis module, a correlation computing module, a second registration module, a responding module, and a second database, the second database configured to preload from the cloud server at least a piece of the APP information registered, the second registration module provided to a user for editing favorable application (APP) information, storing the favorable APP information in the second database, and synchronously uploading the favorable APP information to the first database of the cloud server, the instant messaging servo module configured to receive, transmit, and store instant messages transmitted between the IP-PBX and a host device, the semantic analysis module configured to analyze the instant message obtained from the host device to retrieve at least a key word, the correlation computing module configured to search a related application (APP) in the first database and the second database according to the at least a key word and perform a weight operation on a searched result to generate a correlating result, and the responding module configured to edit and integrate contents according to the correlating result to generate a responding message and transmit the responding message to the instant messaging servo module; and a master application (APP), installed in the host device, including a questioning unit and a displaying unit, the questioning unit provided to the user for inputting the instant message to transmit the instant message to the IP-PBX, and the displaying unit configured to receive and display the responding message obtained by the IP-PBX.

2. The system according to claim 1, wherein the correlation computing module includes an application programming interface (API) transceiver unit and a weight calculation unit.

3. The system according to claim 1, wherein the responding module includes a content integrating unit and a speech editing unit.

4. The system according to claim 1, wherein the instant message includes a speech message.

5. The system according to claim 1, wherein the responding message includes a speech message.

6. The system according to claim 1, wherein the host device is an Internet-enabled electronic device.

7. The system according to claim 6, wherein the electronic device further comprises a global positioning system (GPS) module, a microphone, and a camera.

* * * * *